United States Patent [19]
Truitt

[11] Patent Number: 5,251,944
[45] Date of Patent: Oct. 12, 1993

[54] PULL HANDLE FOR RECYCLING BIN

[76] Inventor: David R. Truitt, P.O. Box 20794, Sarasota, Fla. 34276

[21] Appl. No.: 936,021

[22] Filed: Aug. 19, 1992

[51] Int. Cl.⁵ .............................................. B65G 7/12
[52] U.S. Cl. .................................... 294/15; 294/26; 294/27.1
[58] Field of Search ................ 294/4, 9-18, 294/19.1, 22, 23.5, 24, 26, 27.1, 28, 31.1, 32, 34, 68.1, 68.3, 137, 145, 167-169; 16/111 R, 114 R, 114 A, 115, 124; 220/94 R, 96, 694, 737; 280/19, 24

[56] References Cited

U.S. PATENT DOCUMENTS

| | | | |
|---|---|---|---|
| 85,425 | 12/1868 | Brewer | 294/14 |
| 172,891 | 2/1876 | Poole | 294/26 X |
| 489,372 | 1/1893 | Dister | 294/27.1 |
| 673,830 | 5/1901 | Wade | 294/26 |
| 906,540 | 12/1908 | Mazza et al. | 294/27.1 X |
| 933,963 | 9/1909 | Edwards | 294/27.1 X |
| 2,271,901 | 2/1942 | Smith et al. | 294/26 |
| 2,358,599 | 9/1944 | Schultz | 294/27.1 |
| 3,761,121 | 9/1973 | Reid | 294/26 |
| 4,601,505 | 7/1986 | Chilton | 294/26 |
| 4,624,494 | 11/1986 | Huppert | 294/19.1 X |

FOREIGN PATENT DOCUMENTS

| | | | |
|---|---|---|---|
| 555856 | 2/1960 | Belgium | 294/27.1 |
| 2130455 | 12/1972 | Fed. Rep. of Germany | 294/31.1 |
| 3431400 | 2/1986 | Fed. Rep. of Germany | 294/26 |
| 449824 | 6/1950 | Italy | 294/27.1 |
| 74510 | 1/1949 | Norway | 294/26 |

*Primary Examiner*—Johnny D. Cherry
*Attorney, Agent, or Firm*—Charles J. Prescott

[57] ABSTRACT

A pull handle structured for dragging or sliding a filled recycling bin across the ground. The device, shaped for pulling motion, includes a generally V-shaped hook defined by divergent upright and diagonally upwardly sloping legs. The distal end of the upright leg is rounded to releasably engage into a downwardly curved lifting rim formed around the open upper end of the bin. The second leg includes hand grasping portion to enable a user to pull against the rim via the engaged first leg into the rim to slide the bin across the ground.

3 Claims, 1 Drawing Sheet

5,251,944

PULL HANDLE FOR RECYCLING BIN

BACKGROUND OF THE INVENTION

This invention relates generally to a bin or container used in the collection of recyclable materials and more particularly to a pull handle structured for sliding or dragging a filled recycling bin across the ground.

Recycling bins have now been introduced into many communities for the collection of recyclable materials such as cardboard and plastic. These bins are generally fabricated of molded thin-walled plastic material having a rectangular bottom and upwardly extending side walls. The upper margins of the side walls are outwardly curved to define a lifting rim around the entire open perimeter of these bins.

Normally, at least two such recycling bins are made available or required for purchase within a community for containing and storing the different types of recyclable material for periodic collection. Community members are required to collect the recyclable material within these bins and then, at scheduled intervals, place these bins in position for emptying into a collection vehicle, such as along a roadway.

In addition to requiring additional space within a home or a garage, these recycling bins also become quite heavy to lift when filled. Despite the fact that a convenient lifting rim is formed outwardly extending around the open perimeter of these bins, nonetheless the carrying of these filled bins into a position along the roadway for emptying is difficult at best and may even represent a back injuring procedure.

Portable, wheeled racks have recently been appearing which support these recycling bins in stacked fashion in a garage or utility room so as to provide easy access during filling of the bins. The wheeled, rollable racks are then used in dolly fashion to transport the filled bins into position along the roadway for emptying. Although somewhat more convenient, nonetheless these rollable stacking racks are somewhat expensive and may become unwieldy to tip and move if the bins are improperly stacked or overloaded.

The present invention provides a very portable and easily storable, economical to manufacture, pull handle for dragging or sliding filled recycling bins from the garage or utility room area across the ground into position for pick-up and emptying.

BRIEF SUMMARY OF THE INVENTION

This invention is directed to a pull handle structured for dragging or sliding a filled recycling bin across the ground. The device, shaped for pulling motion, includes a generally V-shaped hook defined by divergent upright and diagonally upwardly sloping legs. The distal end of the upright leg is rounded to releasably engage into a downwardly curved lifting rim formed around the open upper end of the bin. The second leg includes hand grasping means to enable a user to pull against the rim via the engaged first leg into the rim to slide the bin across the ground.

It is therefore an object of this invention to provide a pull handle for dragging or sliding a filled recycling bin across the ground from its stored area to pick-up and disposal area along a roadway.

It is yet another object of this invention to provide an economical, portable and easily storable device for slidably moving filled recycling bins across the ground without the need for manual lifting of these filled bins.

It is still another object of this invention to provide a pull handle for dragging or sliding a filled recycling bin across the ground without risk of tipping or upsetting the recycling bin and the contents thereof.

In accordance with these and other objects which will become apparent hereinafter, the instant invention will now be described with reference to the accompanying drawings.

DETAILED DESCRIPTION OF THE INVENTION

Figure 1:
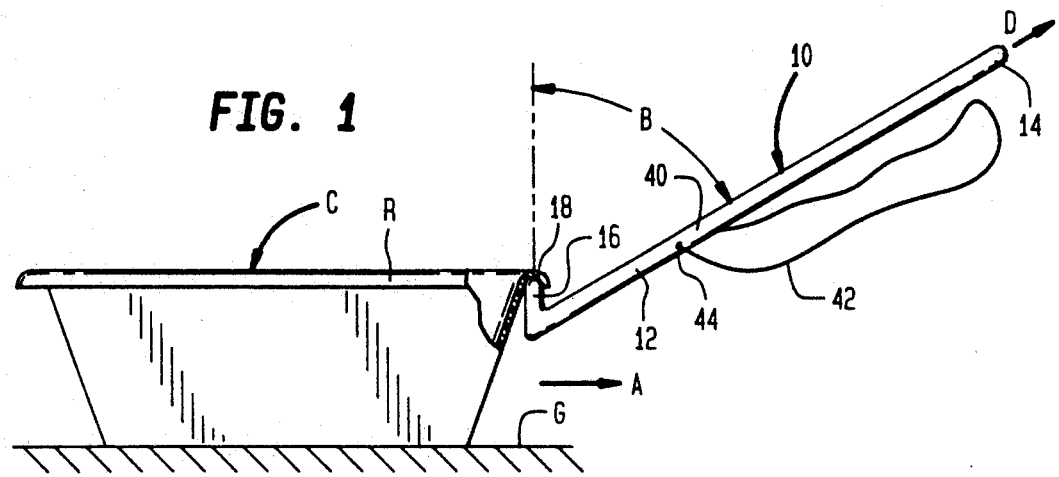
FIG. 1 is a partially broken side elevation view of one embodiment of the invention in use in conjunction with a recycling bin, another embodiment of the invention shown in phantom.

Referring now to the drawings, and particularly to FIG. 1, one embodiment of the invention is there shown generally at numeral 10 in place ready for sliding movement in the direction of arrow A of a plastic, thin-wall molded recycling bin C. This recycling bin C is formed having a generally rectangular bottom which rests atop the ground G and upwardly extending side walls which terminate to define an outwardly and downwardly curved lifting rim R.

This embodiment 10 is generally V-shaped having an upright leg 16 and a diagonally upwardly extending leg or handle 12. The entire device 10 is formed of molded plastic, leg 12 defining an elongated pull handle having a gripping end 14 for grasping and pulling in the direction of arrow D. Of course, elongated handle 12 is of a length sufficient so that a user, standing on the ground, may conveniently grasp handle portion 14 without the necessity of stooping or bending over.

The upright leg 16 includes a generally rounded distal end 18 which matably engages into the downwardly curved hand rim R at any convenient place therealong. By pulling the handle 12 in the direction of arrow D, sufficient force is manually provided to both maintain engagement of distal end 18 into rim R and to slide the filled bin C along the ground in the direction of arrow A from one location to another.

Generally, the V-configuration between upright leg 16 and diagonally extending handle 12 defines an angle B therebetween which is preferably at an acute angle of up to 90 degrees.

Figure 2:
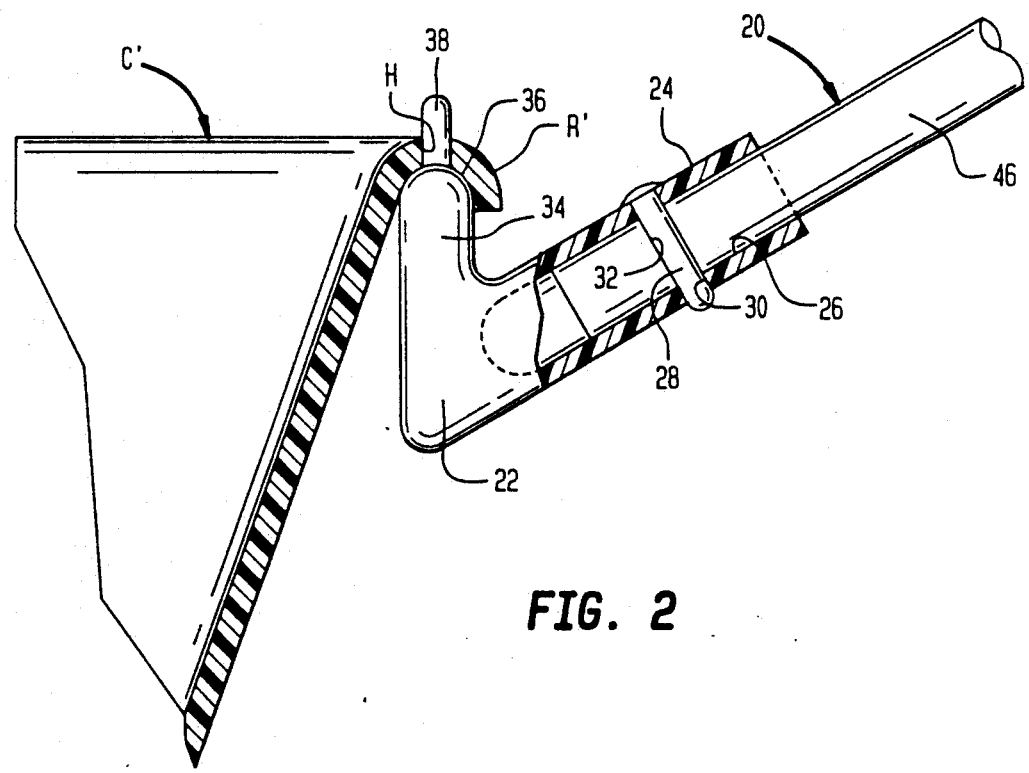
FIG. 2 is an partially broken side elevation view of another embodiment of the invention in use in conjunction with a recycling bin.

Referring now to FIG. 2, another embodiment of the invention is there shown generally at numeral 20 and includes a V-shaped hook member 22 having an upright leg 34 and a diagonally extending tubular leg 24. The tubular leg 24 is interconnected to a lower end of an elongated rigid handle extension 46 which upwardly extends coaxially with tubular leg 24 to a length similar to that previously described in FIG. 1. Interconnection of the handle extension 46 is accomplished by fitting the lower end thereof into cylindrical surface 26. A pin 28 within aligned holes 30 and 32 formed through the tubular leg 24 and adjacent the lower end of the handle extension 46, respectively, secures this arrangement as shown.

The upright leg 34 includes a generally rounded distal end 36 as previously described which matably engages upwardly into the downwardly curved rim R' of recycling bin C' which is modified as described as follows. A rim engagement pin 38 forms an upward extension of upright leg 34, being smaller in diameter than the diameter of upright leg 34. This pin 38 matably engages into an upright hole H formed having an upright axis through an upper surface of rim R' so as to add positive interengagement between upright leg 34 and the modified rim R' of bin C'.

Referring back to FIG. 1, another embodiment of the invention is shown in phantom and includes a foreshortened diagonal leg 12 which terminates at 40. A loop of flexible rope 42 is engaged into a transverse hole 44 formed adjacent the distal end 40 of diagonal leg 42 so that the user may grasp the free end of loop 42 for pulling motion as previously described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A portable pull handle attachable to a recyclin bin structured for dragging or sliding the bin across the ground, the bin having a generally rectangular bottom and upwardly extending side walls which define an open upper end of the bin, comprising:

a generally V-shaped hook having a first upright leg and a second elongated diagonally upwardly extending second leg;

said first leg having a generally rounded distal upper end sized to upwardly detachably engage into and to substantially conform to a curvature of a downwardly curved lifting rim connected to and outwardly extending from the side walls of the bin;

said second leg including extension means for hand grasping and pulling said hook in a direction generally in alignment with said second leg when said first leg distal end is engaged into the rim of the bin;

said first and second legs being oriented at an acute angle one to another;

an upright straight rim engagement pin smaller in transverse size than said first leg and coaxially connected and upwardly extending from said first leg;

said pin rounded at an upper distal end thereof and sized to matingly engage within a hole formed through an upper surface of the rim.

2. A pull handle for a recycling bin as set forth in claim 1, wherein:

said extension means includes an elongated rigid handle extension rigidly connected in axial alignment with said second leg.

3. A pull handle for a recycling bin as set forth in claim 1, wherein:

said extension means is a loop of flexible rope connected adjacent a distal end of said second leg.

* * * * *